S. G. MORRISON.
EMERY GRINDING-WHEEL.

No. 172,337. Patented Jan. 18, 1876.

Witnesses: Inventor:

UNITED STATES PATENT OFFICE.

SAMUEL G. MORRISON, OF WILLIAMSPORT, PENNSYLVANIA.

IMPROVEMENT IN EMERY GRINDING-WHEELS.

Specification forming part of Letters Patent No. 172,337, dated January 18, 1876; application filed May 27, 1875.

*To all whom it may concern:*

Be it known that I, SAMUEL G. MORRISON, of Williamsport, Pennsylvania, have invented an Emery Grinding-Wheel, (being an improvement upon my patent emery-wheel, dated May 11, 1875, No. 163,025,) of which the following is a specification:

The object of my invention is to form an emery grinder on a metal plate truly centered, carrying the emery substance or grinding-substance upon the edge of the metal plate, permanently attached thereto, and of any desired thickness greater than the thickness of the metal plate.

Figure 1:
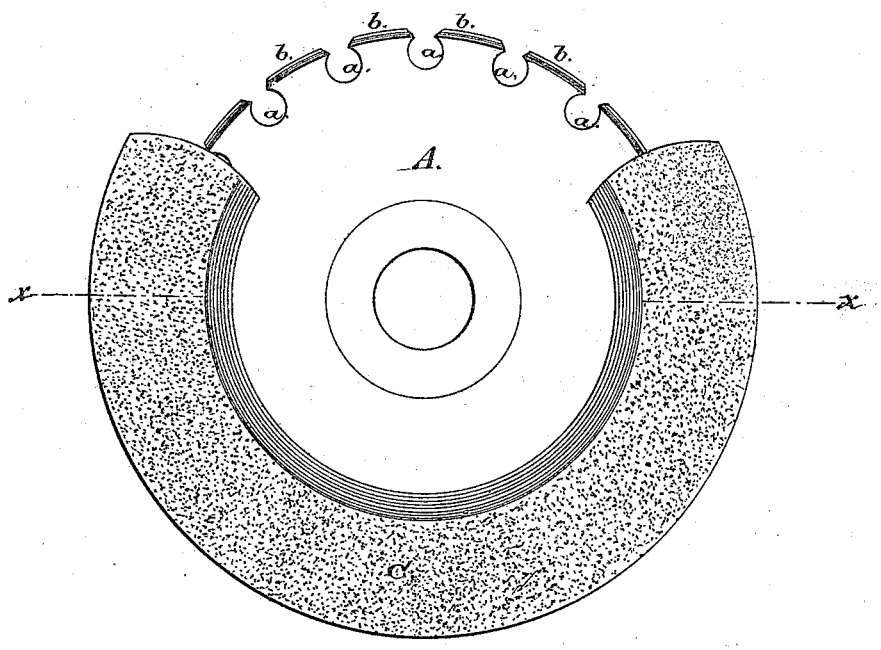

The construction of my emery grinder is illustrated more in detail in the plan view, Figure 1, in the drawings forming part of this specification, a section of the grinding-body being left off for the purpose of exhibiting the form and structure of the metal plate. The plate may be made of cast or wrought metal, truly centered, with a hole suitable to go upon an arbor, and of such diameter and proportion as to allow of an attachment of the grinding substance suited to the intended speed of the wheel. The periphery of the plate has a rib on either side thereof, and at suitable points the outer edge of the plate is cut through radially by dovetails, after which the plate intended to receive and hold the grinding substance is placed in the iron mold, and secured so as to receive in molding the required amount of the composition on either side and around it.

Figure 3:
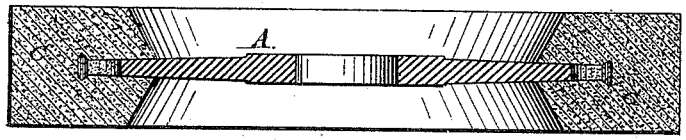
Figure 2:
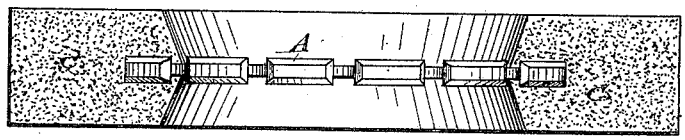

A is the metal plate, cut through at its diameter. (Shown in Fig. 3.) The rib is shown by $b\ b\ b\ b$ in Fig. 1. The dovetails are shown by $a\ a\ a\ a\ a$ in Fig. 1. C shows the emery grinding substance. Fig. 2 is a face view of the periphery of the plate.

I do not claim emery grinders with metal, wood, or stone centers, for I am aware such are in use; but What I do claim is—

A metal-plate center with dovetails $a\ a\ a\ a$ and rib $b$, in combination with a body of emery or other grinding substances, substantially as and for the purpose specified.

SAMUEL G. MORRISON.

Witnesses:
HEPBURN McCLURE,
STEPHEN W. HALL.